United States Patent
Kiik

(10) Patent No.: US 11,315,483 B2
(45) Date of Patent: Apr. 26, 2022

(54) SYSTEMS, DEVICES, AND METHODS FOR AN INFRARED EMITTING DISPLAY

(71) Applicant: GOOGLE LLC, Mountain View, CA (US)

(72) Inventor: Martin Joseph Kiik, Waterloo (CA)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/850,550

(22) Filed: Apr. 16, 2020

(65) Prior Publication Data
US 2020/0335032 A1    Oct. 22, 2020

Related U.S. Application Data

(60) Provisional application No. 62/835,578, filed on Apr. 18, 2019.

(51) Int. Cl.
G09G 3/32    (2016.01)
H04N 5/33    (2006.01)
G06F 3/01    (2006.01)

(52) U.S. Cl.
CPC ............ G09G 3/32 (2013.01); G06F 3/013 (2013.01); H04N 5/33 (2013.01)

(58) Field of Classification Search
CPC ............ G09G 3/32; H04N 5/33; G06F 3/013
See application file for complete search history.

(56) References Cited

U.S. PATENT DOCUMENTS

| | | | | |
|---|---|---|---|---|
| 5,642,125 | A  * | 6/1997  | Silverstein | G02F 1/13473 345/87 |
| 10,217,402 | B1 * | 2/2019  | Vahid Far   | G09G 3/2088 |
| 2011/0242372 | A1 * | 10/2011 | Kosaka | H04N 9/04519 348/242 |
| 2015/0261003 | A1 * | 9/2015  | Morifuji | H04N 13/144 345/8 |
| 2017/0070689 | A1 * | 3/2017  | Silverstein | H01L 27/14643 |
| 2018/0343373 | A1 * | 11/2018 | Satou | G06K 9/00845 |
| 2019/0041983 | A1 * | 2/2019  | Hicks | G06F 3/013 |

* cited by examiner

*Primary Examiner* — Alexander Eisen
*Assistant Examiner* — Kebede T Teshome

(57) ABSTRACT

Systems, devices, and methods for tracking eye movement and gaze direction using infrared light are described. The method includes projecting infrared light from at least one pixel in the display screen to the eye of the user, detecting a plurality of reflections of the infrared light from the eye, determining the relative intensity of each of the plurality of the reflections, identifying, from the plurality of reflections, a region of the eye that corresponds to a relatively low intensity reflection, and determining a position of the eye based on the region of the eye that corresponds to the relatively low intensity reflection.

20 Claims, 11 Drawing Sheets

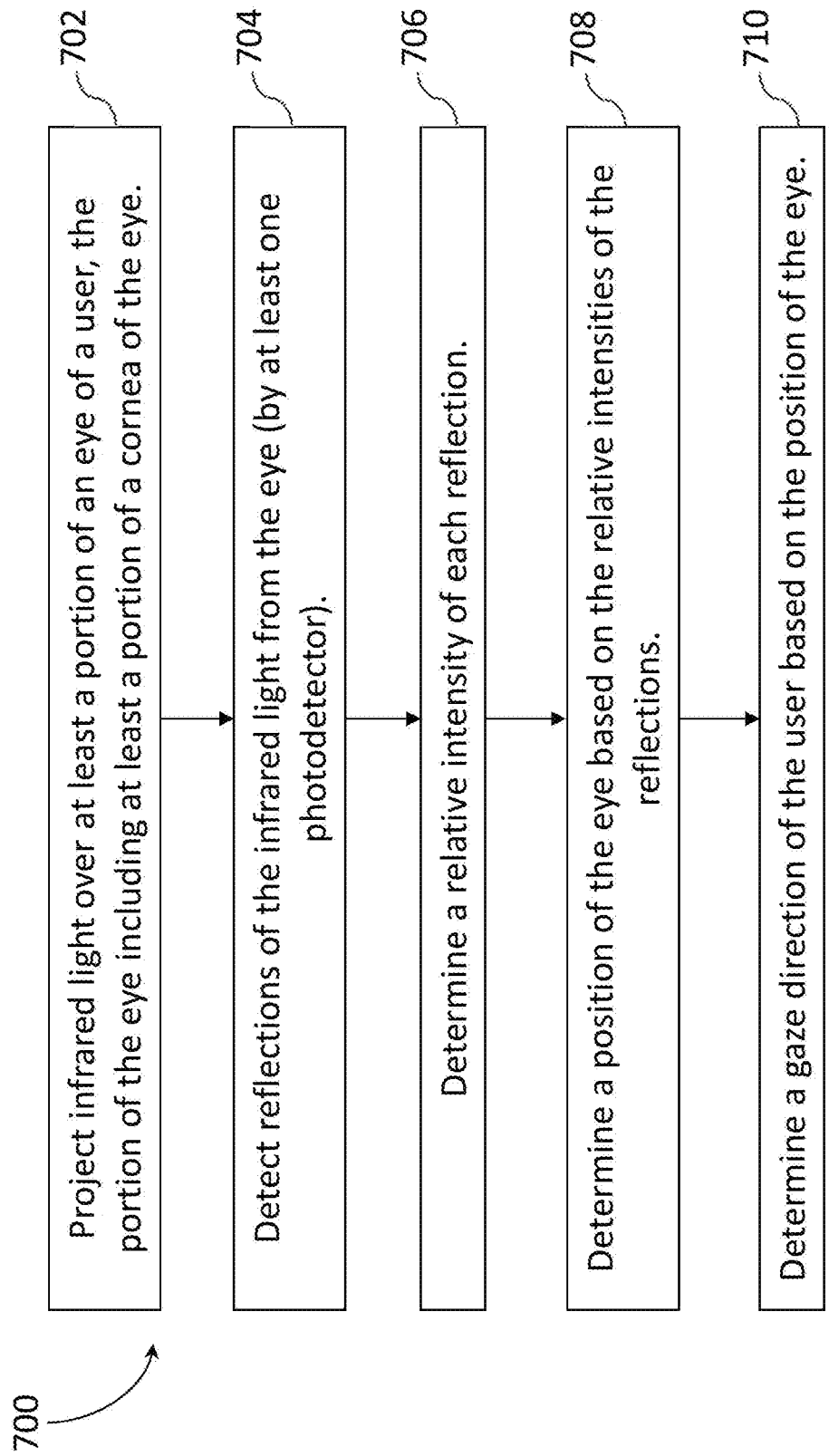

SYSTEMS, DEVICES, AND METHODS FOR AN INFRARED EMITTING DISPLAY

CROSS-REFERENCE TO RELATED APPLICATIONS

This application claims the benefit of U.S. Provisional Application No. 62/835,578, filed Apr. 18, 2019, the content of which is incorporated herein by reference in its entirety.

TECHNICAL FIELD

The present systems, devices, and methods generally relate to displays and particularly relate to microLED displays which emit infrared light to track the eye movements of a user viewing the display.

BACKGROUND

Description of the Related Art

Eye Tracking

Eye tracking is a process by which the position, orientation, and/or motion of the eye is measured and/or monitored. Typically, the position, orientation, and/or motion of a specific feature of the eye, such as the cornea, pupil, iris, or retinal blood vessels, is measured and/or monitored. Eye tracking information may be used to determine the gaze direction of the eye and deduce what the user is looking at, which in turn may be used to interact with content displayed by a display the user is looking at. Thus, eye tracking has the potential to provide an interface for interacting with a display. A limitation of most eye tracking technologies developed to date is that they compromise the aesthetic design of a display when incorporated therein, either directly due to bulk of the physical eye tracking components and/or indirectly due to large power requirements of the eye tracking components or processes, which necessitate a large battery to be incorporated into the display.

The eye may be tracked in a variety of different ways, the least invasive of which typically employs a camera to capture images and/or videos of the eye. Such camera-based methods typically involve illuminating the complete eye area all at once with infrared light and analyzing images/videos of the illuminated eye to identify characteristic reflections of the infrared light from a particular eye feature. Corneal reflection, also known as the first Purkinje image or "glint," is a characteristic reflection that is used by many camera-based eye trackers. To summarize, conventional eye tracking methods illuminate the eye to produce a characteristic reflection, such as the glint, and analyze images/videos of the eye to identify the relative position and/or motion of the glint.

Camera-based eye trackers consume a relatively large amount of power. Eye movements can be very fast (on the order of milliseconds) so in order to keep track of the eye both the infrared illumination and the camera are required to be active very often (e.g., at all times, high sampling frequency). In many cases, the camera may provide a constant (or near-constant) video stream that is highly consumptive of power. Additionally, the computational processing required to identify glints in such video/photo streams is quite high and therefore also consumptive of significant power. This high power consumption means that camera-based eye trackers generally require a large power supply, so their incorporation into displays typically contributes significant bulk to the overall aesthetic.

There is a need in the art for systems, devices, and methods of eye tracking that can integrate into a display system with minimal effect on the size and form factor of the system while also minimizing energy consumption.

BRIEF SUMMARY

Disclosed herein is a display system for displaying visible content and tracking eye movement. The display system comprises a plurality of pixels. The plurality of pixels includes at least a first pixel, wherein the first pixel includes an infrared emitter, and at least one of: a red emitter, a blue emitter and a green emitter, wherein the infrared emitter projects infrared light onto an eye of a user. The first pixel may include an infrared emitter, a red emitter, a blue emitter, and a green emitter.

The plurality of pixels may be arranged in a two-dimensional array, wherein each pixel in the array includes an infrared emitter, a red emitter, a blue emitter and a green emitter. The plurality of pixels may be arranged in a two-dimensional array, wherein adjacent pixels in each row and column of the array alternate between: a first pixel, wherein the first pixel includes a red emitter, a blue emitter, a green emitter and an infrared emitter; and a second pixel, wherein the second pixel includes a red emitter, a blue emitter and two green emitters. The plurality of pixels maybe arranged in a two-dimensional array, wherein each pixel positioned at a corner of the array includes a red emitter, a blue emitter, a green emitter and an infrared emitter, and wherein each pixel not positioned at a corner of the array includes a red emitter, a blue emitter, and two green emitters.

The display system comprises at least one infrared photodetector positioned proximate the plurality of pixels and oriented to detect infrared light reflected from the eye. The display system may include a plurality of infrared photodetectors all positioned proximate the plurality of pixels and oriented to detect infrared light reflected from the eye.

The display system comprises a processor communicatively coupled to the infrared emitting pixel and the infrared photodetector. The processor determines a position of the eye based on reflections of the infrared light detected by the infrared photodetector(s).

The display system may further comprise: a backplane coupled to the plurality of pixels to modulate the drive current to each emitter; a focusing lens positioned and oriented to focus light emitted by the plurality of pixels; a blur filter, or a scattering screen, positioned and oriented to color combine the light emitted by the plurality of pixels at a focal point; and optics to direct light from the scattering screen to a destination of an image.

The display system and its constituent parts may be respective components of a device to display visible content and track eye movement.

Also disclosed herein is a micro display for emitting visible light and infrared light. The micro display comprises a set of micro light-emitting diode (uLED) pixels arranged in a two-dimensional array. The set of pixels includes at least a first subset of pixels. Each pixel in the first subset of pixels comprises a red uLED to emit red light, a green uLED to emit green light, a blue uLED to emit blue light and an infrared uLED to emit infrared light.

For each pixel in the first subset of pixels, the red uLED, the green uLED, the blue uLED and the infrared uLED may be arranged in a 2 by 2 Bayer-like configuration. The 2 by 2 Bayer-like configuration includes a first uLED position, a second uLED position, a third uLED position and a fourth uLED position. Each of the red uLED, the blue uLED, the green uLED and the infrared uLED may occupy one of the first uLED position, the second uLED position, the third uLED position and the fourth uLED position.

The micro display may include a second subset of pixels. Each pixel in the second subset of pixels comprises at least one red uLED to emit red light, at least one blue uLED to emit blue light, and at least one green uLED to emit green light. Each pixel in the second subset of pixels may include a first green uLED, a second green uLED, a red uLED and a blue uLED arranged in a 2 by 2 Bayer-configuration. The first green uLED may be diagonally opposite the second green uLED in the 2 by 2 Bayer-configuration.

The micro display may further comprise a backplane coupled to the set of uLED pixels to modulate a drive current to each uLED.

Also disclosed is a method of tracking eye movement of a user viewing a display screen. The method comprises: projecting infrared light from at least one pixel in the display screen to an eye of the user; detecting a plurality of reflections of the infrared light from the eye; determining the relative intensity of each of the plurality of the reflections; and determining a position of the eye based on the relative intensities of the reflections of the infrared light from the eye.

Projecting infrared light from at least one pixel in the display screen may include projecting infrared light from at least one uLED in the display screen. Projecting infrared light from at least one pixel may include projecting infrared light from a plurality of pixels in the display screen. Projecting infrared light from a plurality of pixels in the display screen may include projecting infrared light from each pixel successively. The method may include detecting diffuse reflections of the infrared light from the eye.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 7 is a flow chart of a method for determining a gaze direction of a user, in accordance with an embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for an infrared emitting display and are particularly well-suited for use in mobile electronics, but not limited to, smartphones, tablets, smartwatches, laptop computers and wearable heads-up displays.

Display systems include microLED displays. MicroLED displays include arrays of microscopic light emitting diodes (LEDs) forming individual pixel elements. Compared to LCD systems, microLEDs may have lower energy requirements and offer advantages such as lower latency, higher contrast ratio and greater color saturation. Compared to OLED systems, microLEDs offer higher brightness and better energy efficiency. Given these attributes, microLEDs are may be used in portable electronic devices having a screen for displaying visible content.

Figure 1A:
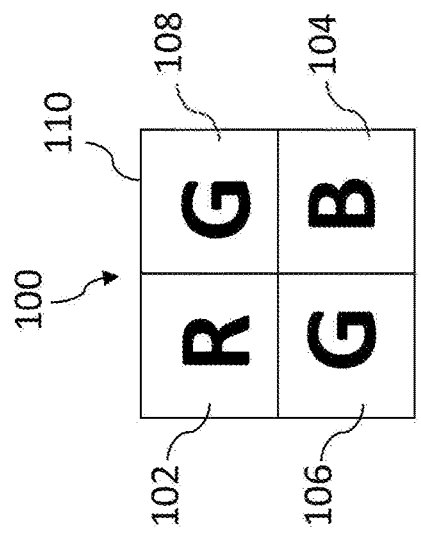
FIGS. 1A and 1B are block diagrams of conventional pixel geometries having emitters in a Bayer arrangement.

Referring to FIG. 1A, illustrated therein is a pixel geometry 100 for use in a microLED pixel 110. The pixel geometry 100 is the arrangement of light producing components within the pixel 110. The pixel 110 includes a red emitter 102, a blue emitter 104 and two green emitters 106 and 108.

The red emitter 102 is capable of emitting red light in range of 635-700 nm. The blue emitter 104 is capable of emitting blue light in the range of 450-490 nm. The green emitters 106 and 108 are capable of emitting light in the range of 520-560 nm. The green emitters 106 and 108 are positioned in diagonally opposite quadrants of the pixel 110.

The pixel 110 is arranged in a Red-Green-Green-Blue configuration that is similar to the Bayer color filter array used in image sensors. The Bayer configuration mimics the physiology of the human eye wherein 50% of photoreceptors in the eye are most responsive to green light. The pixel 110 allows for 50% of the light emitted to be green light so that the human eye's responsivity to green light is maximized. By varying drive power to the individual emitters 102, 104, 106 and 108 the light emitted by the pixel 110 can be any visible light.

Figure 1B:
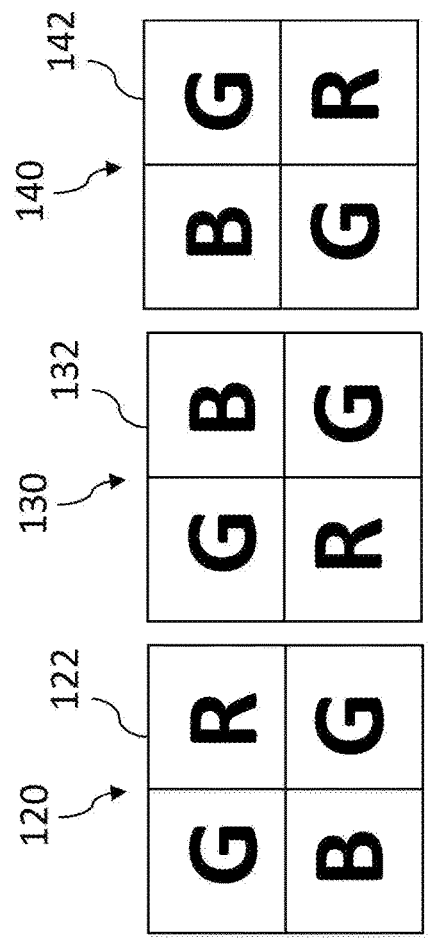

Pixel geometry 100, represents one possible arrangement of the emitters 102, 104, 106 and 108 within the pixel 110. Referring to FIG. 1B, illustrated therein are three additional Bayer-like pixel geometries 120, 130 and 140. Each pixel 120, 130 and 140 are substantially similar to pixel 110 and include a red emitter (labelled R), a blue emitter (labelled B), and two green emitters (labelled G). The pixel geometries 100, 120, 130 and 140 have different arrangements of the emitters R, B and G within the pixels.

Figure 2A:
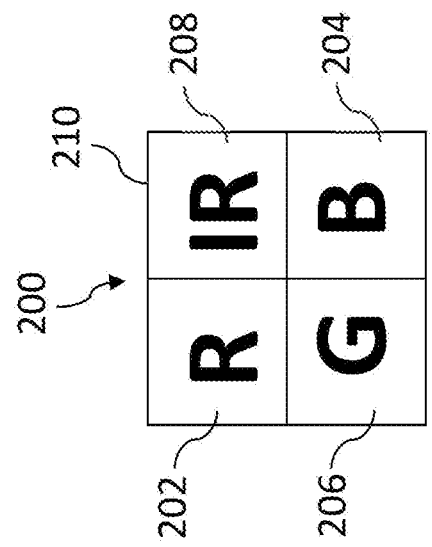
FIG. 2A is a block diagram of a pixel geometry having an infrared emitter, in accordance with an embodiment.

Referring to FIG. 2A, illustrated therein is a pixel geometry 200, in accordance with an embodiment. Pixel 210 includes a red emitter 202, a blue emitter 204 and a green emitter 206. Pixel 210 also includes an infrared emitter 208. The infrared emitter 208 emits infrared light in the range of 1000±200 nm.

The pixel 210 emits infrared light in addition to visible light. Infrared light is undetectable by the human eye. The infrared light emitted by emitter 208 can be used to track the eye movement of a user viewing a display incorporating pixel geometry 200. Counterintuitively, the pixel 210 has less than 50% green light emission, as would be emitted in a conventional Bayer-configuration.

Figure 2B:
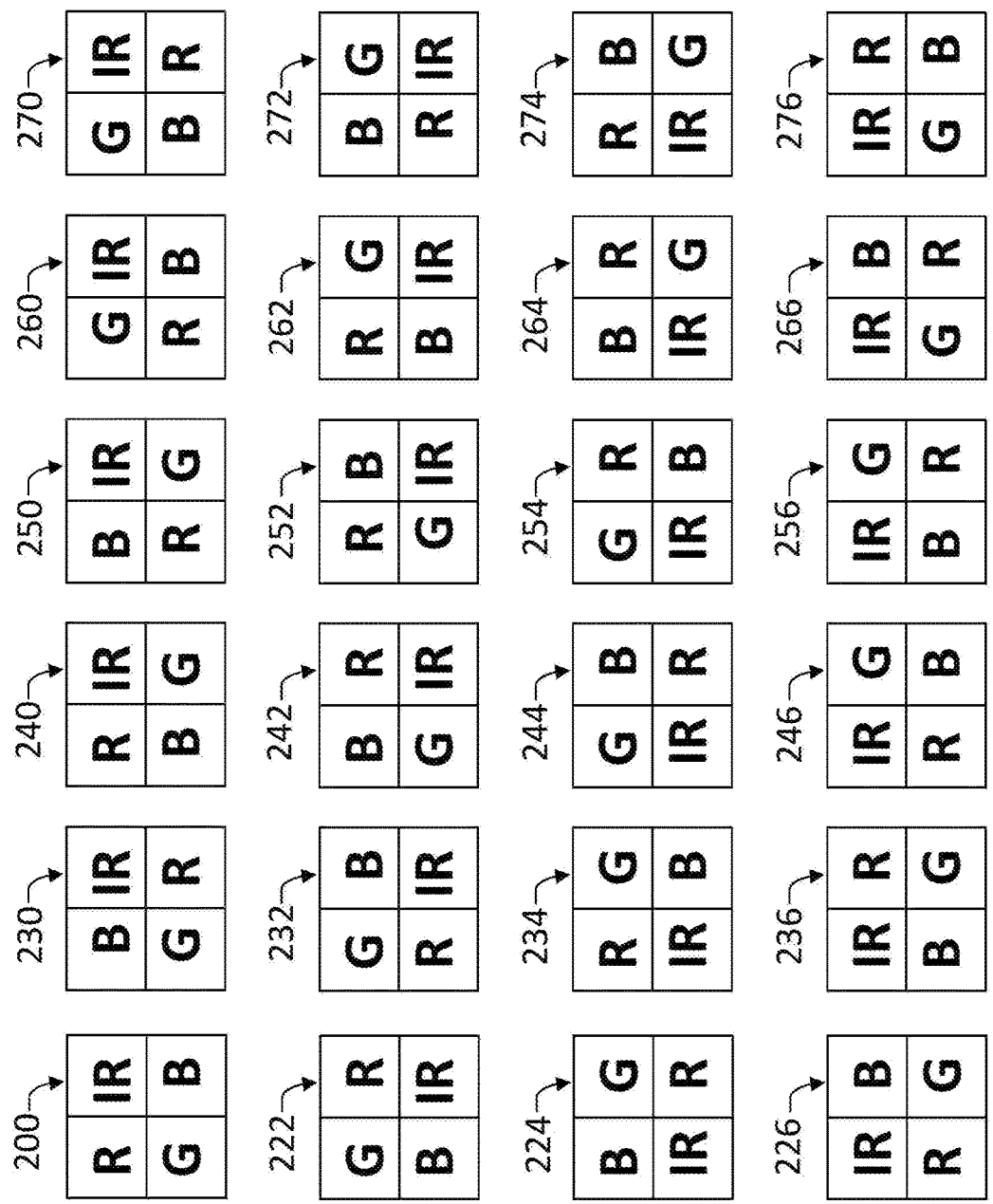
FIG. 2B are block diagrams of pixels geometries having an infrared emitter, in accordance with further embodiments.

Pixel geometry 200, represents one possible arrangement of the emitters 202, 204, 206 and 208 within the pixel 210. Referring to FIG. 2B, illustrated therein is are additional pixel geometries (222, 224, 226, 230, 232, 234, 346, 240, 242, 244, 246, 250, 252, 254, 256, 260, 262, 264, 268, 270, 272, 274 and 276), with different arrangements of the different emitters (i.e. 202, 204, 206 and 208 in FIG. 2A) within the pixel. One or more of the pixel geometries (200, 222, 224, 226, 230, 232, 234, 346, 240, 242, 244, 246, 250, 252, 254, 256, 260, 262, 264, 268, 270, 272, 274 and 276) may be incorporated into a larger display.

Figure 3A:
FIG. 3A is a block diagram of a pixel array having a plurality of infrared emitting pixels, in accordance with an embodiment.

Referring to FIG. 3A, illustrated therein is a two-dimensional pixel array 300, in accordance with an embodiment. The pixel array 300 includes a plurality of pixels (such as pixel 220 in FIG. 2A) arranged into rows and columns of ten pixels each. Generally, a number x≥1 of pixels in each row, and a number of pixels in each column is possible. In the embodiment shown, each pixel in the pixel array 300 has the same pixel geometry (i.e., pixel geometry 200 of FIG. 2A). In other words, every pixel in pixel array 300 includes a red emitter (labelled R), a blue emitter (labelled B), a green emitter (labelled G) and an infrared emitter (labelled IR) arranged in the same configuration. According to other embodiments, the pixel array 300 may include a plurality of pixels having more than one pixel geometry.

Figure 3B:
FIG. 3B is a block diagram of a pixel array having a plurality of infrared emitting pixels, in accordance with another embodiment.

Now referring to FIG. 3B, illustrated therein is a pixel array 302, in accordance with an embodiment. The pixel array 302 includes a plurality of pixels wherein a first subset of the pixels (shown shaded) has a first pixel geometry (i.e., pixel geometry 100 of FIG. 1A), and a second subset of the pixels (shown unshaded) has a second pixel geometry (i.e. pixel geometry 200 of FIG. 2A). The pixels in the pixel array 302 alternate between pixel geometry 100 and pixel geometry 200 such that adjacent pixels in each row and column have a different pixel geometry.

Figure 3C:
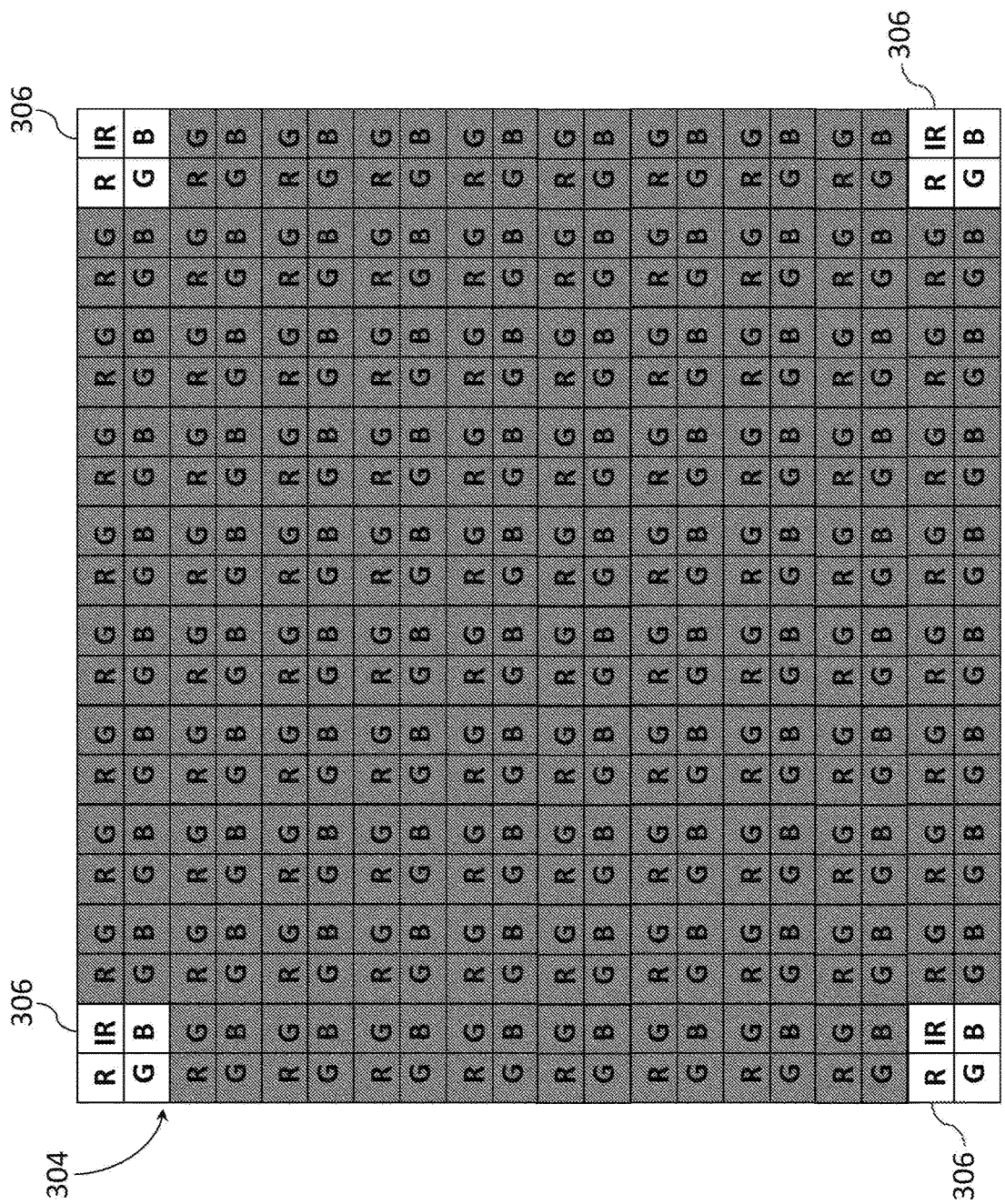
FIG. 3C is a block diagram of a pixel array having a plurality of infrared emitting pixels, in accordance with another embodiment.

Referring to FIG. 3C, illustrated therein is a pixel array 304, in accordance with yet another embodiment. Pixel array 304 includes a plurality of pixels wherein a first subset of the pixels 306 at the corners of the pixel array 304 have a first pixel geometry (i.e., pixel 200 of FIG. 2A), and a second subset of the pixels (shown shaded) have a second geometry (i.e., pixel geometry 100 of FIG. 1A). Pixel arrays 300, 302 and 304 are examples of the possible arrangements of pixels with different geometries within a display array. Those skilled in the art will understand that other arrangements of pixels within a display array are possible. Pixel arrays such as 300, 302 and 304 may be incorporated into a display system to display visible content.

Figure 4:
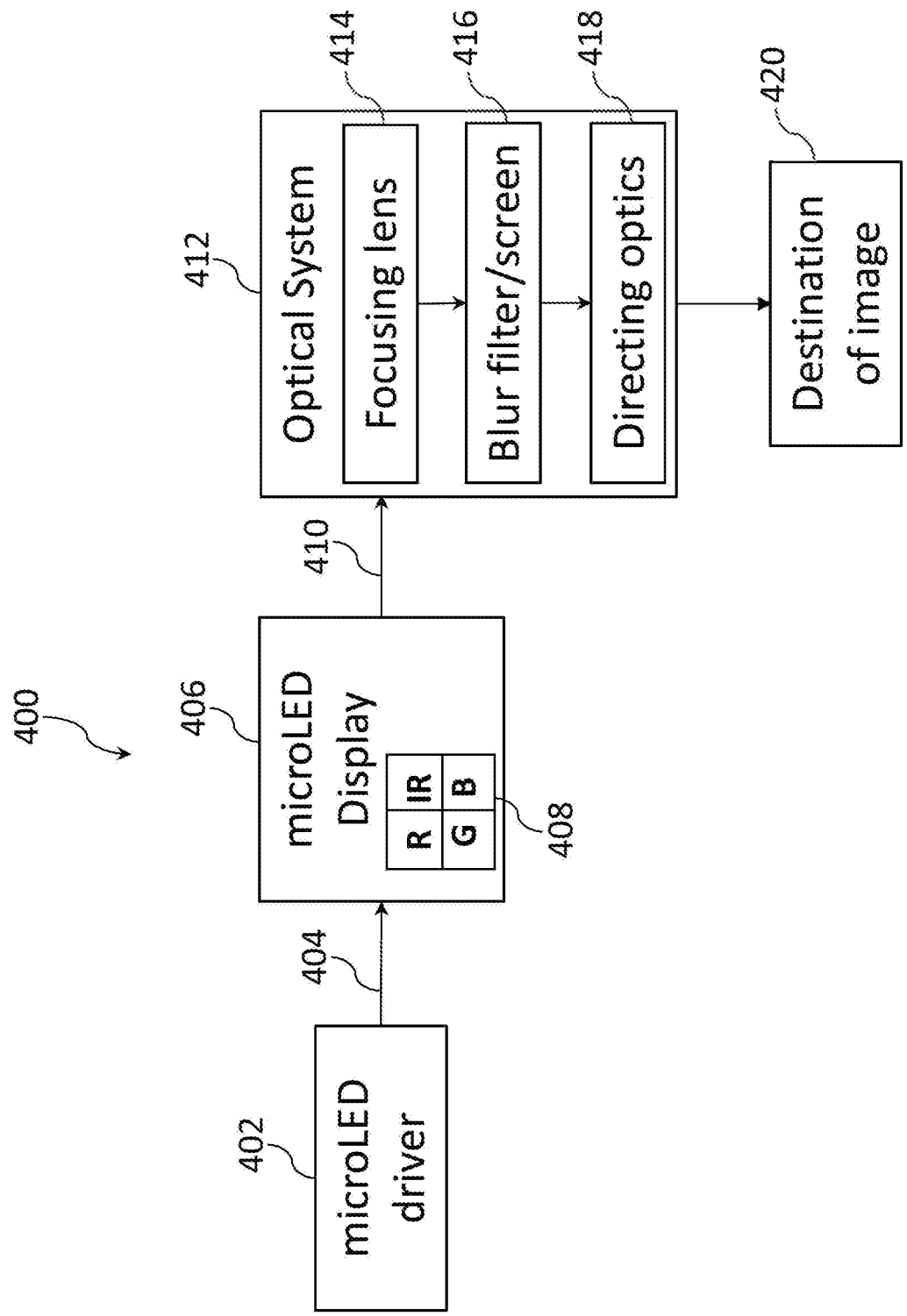
FIG. 4 is a block diagram of a display system, in accordance with an embodiment.

Referring to FIG. 4, illustrated therein is a display system 400, in accordance with an embodiment. The display system 400 includes a microLED driver 402. The microLED driver 402 sends drive and clocking signals 404 to a microLED display 406. The microLED display 406 may include a pixel array (such as pixel array 300, 302 or 304 of FIG. 3). Generally, the display array may comprise a number x≥1 of pixels (such as pixel 210 in FIG. 2A) in each row, and a number y≥1 of pixels in each column. The drive and clocking signals 404 address the individual red emitter (labelled R), the green emitter (labelled G), the blue emitter (labelled B), and the infrared emitter (labelled IR), within each pixel 408 of the microLED display 406.

A display output 410 from the microLED display 406 is sent to an optical system 412. The optical system 412 includes a focusing lens 414 and a blur filter 416. The focusing lens 414 focuses the display output 410 onto the blur filter 416. The blur filter 416 combines the color signals in the display output 410.

The display system 400 may optionally include a scattering screen (not shown), in place of the blur filer 416, to combine the color signals in the display output 410.

The optical system 412, further includes directing optics 418 to direct the display output 410 to an image destination 420. The display system 400 may be capable of integration into a device for the purposes of displaying visual content and tracking the eye movements of a user viewing the display.

Figure 5A:
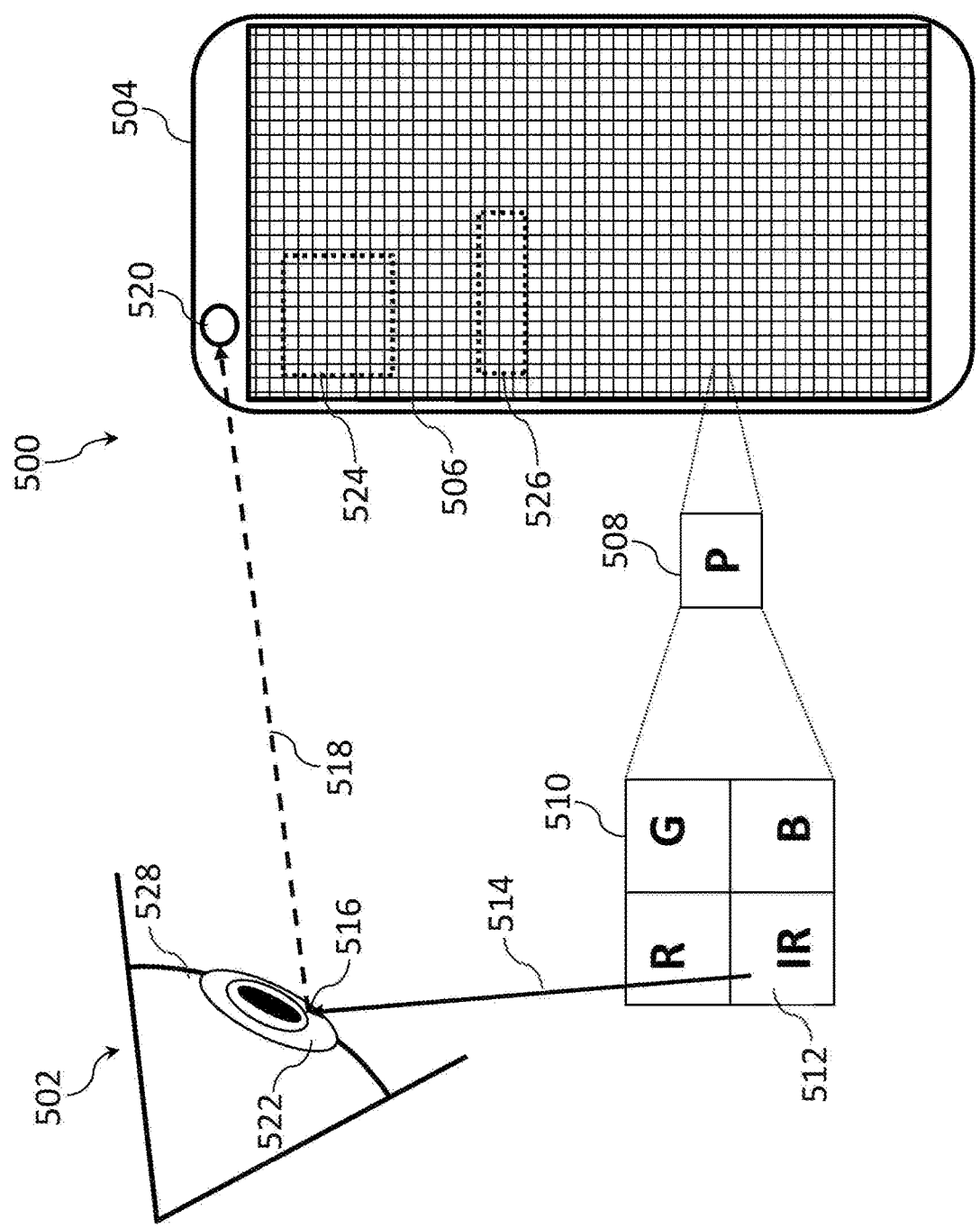
FIG. 5A is a diagram of an eye tracking system, shown in relation to a user's eye, in accordance with an embodiment.

Referring to FIG. 5A, illustrated therein is a diagram of an eye tracking system 500, for tracking eye movements of a user, in accordance with an embodiment. The eye tracking system 500 includes a device 504 and an eye 502 of a user.

The device 504 is depicted as a smartphone, but may be any electronic device having a display system (such as display system 400 of FIG. 4). The device 504 includes a microLED display 506 (such as microLED display 406 of FIG. 4). The microLED display 506 is used to display visible content and emit infrared light to illuminate at least a part of a user's eye for the purpose of tracking the gaze of the user. The microLED display 506 includes a pixel array (such as pixel array 300, 302 or 304 in FIG. 3), of which a pixel 508 (i.e., Pixel 210 in FIG. 2A) is shown magnified. The pixel 508 has a pixel geometry 510 having a red emitter (labelled R), a blue emitter (labelled B), a green emitter (labelled G) and an infrared emitter 512 (labeled IR).

Infrared light 514 from the infrared emitter 512 impinges on at least a portion of the eye 502 of the user. The portion of the eye 502 may include at least a portion of the cornea 522. The infrared light 514 is reflected from at least one point 516 on the eye 502.

For the purposes of the present systems, devices, and methods, the term "reflection" and variants such as "reflected" are used for the sake of simplicity and brevity to describe light redirecting from the eye 502 even though non-reflective effects, such as diffractive effects, may contribute to the redirection. The redirection (e.g., reflection, refraction, diffraction, or combination thereof) of infrared light 514 from the eye 502 may be of varying completeness depending on the specific conditions. In other words, the eye 502 may redirect all or only a portion (e.g., 25%, 50%, 75%, or otherwise) of the infrared light incident thereon depending on the angle of the incident light 516 relative to the normal of the eye 502 and the proximity of the eye 502 to the infrared emitter 512 from which the infrared light 514 is emitted.

To detect reflected infrared light 518 from the eye 502, the device 504 includes at least one photodetector 520. The term "photodetector" is used generally herein to refer to a detector that is sensitive and responsive to light (i.e., infrared light in the case of an infrared photodetector) and provides signals in response to sensing or detecting such light. The photodetector 520 is positioned proximate to the microLED display 506. In embodiments where multiple photodetectors 520 are employed, the multiple photodetectors 520 may be physically clustered together or spatially separated on the device 504 so long as the photodetectors 520 are proximate to the microLED display 506.

The device 504 further includes at least one processor 524 communicatively coupled the microLED display 506 and the photodetector 520. The device 504 includes at least one storage medium or memory 526 communicatively coupled to the processor 524. The memory 526 stores processor-executable instructions and/or data that, when executed by processor 524, cause device 504 to implement eye tracking (at least) as described herein.

Figure 5B:
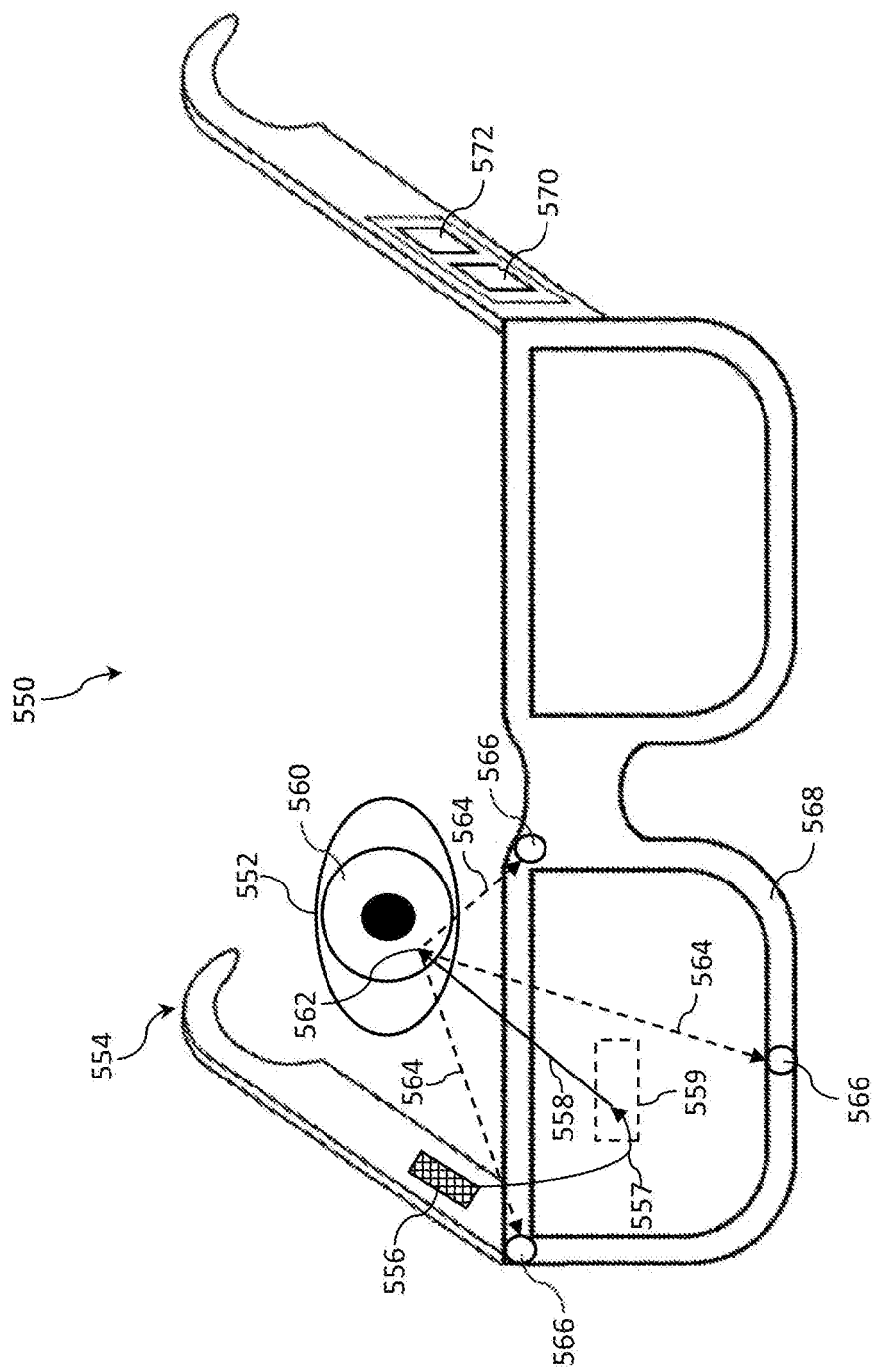
FIG. 5B is a diagram of an eye tracking system, shown in relation to a user's eye in accordance with another embodiment.

Now referring to FIG. 5B, illustrated therein is a diagram of an eye tracking system 550, for tracking eye movements of a user, in accordance with an embodiment. The eye tracking system 550 includes a wearable heads-up display (WHUD) 554 and an eye 552 of a user.

The WHUD 554 includes a frame 568 and a micro display 556 positioned within the frame 568. The micro display 556 is a miniaturized version of display system 400 of FIG. 4 and is shown magnified in FIG. 5B for illustration purposes. The micro display 556 includes a pixel array (such as pixel array 300, 302 and 304 in FIG. 3) including a plurality of microLED pixels capable of emitting visible and infrared light (i.e., pixel 210 in FIG. 2A). Infrared light 558 from the micro display 556 is routed to an area 559 within the user's field of view and directed to the eye 552 by routing optics (exemplified by arrow 557) within the WHUD 554. The routing optics 557 may include waveguides. The infrared light 558 illuminates at least a portion of a user's eye 552 for the purpose of tracking the gaze of the user.

According to another embodiment, the micro display 556 may itself be positioned within the user's field of view to direct infrared light 558 (and visible light) to the eye 552 without the need for routing optics 557.

Infrared light 558 routed from the micro display 556 impinges on at least a portion of the eye 552 of the user. The portion of the eye 552 may include at least a portion of the cornea 560. The infrared light 558 is reflected from at least one point 562 on the eye 502.

To detect reflected infrared light 564 from the eye 552, the WHUD 554 includes a plurality of photodetectors 566. While three photodetectors 566 are depicted in FIG. 5B, in alternative embodiments any number of photodetectors 566 may be used (i.e., an array of photodetectors, or a charge-coupled device-based camera that is responsive to light in the infrared wavelength range). Multiple photodetectors 566 may be employed to improve the accuracy/precision of gaze direction determination by, for example, comparing the signals from each.

The photodetectors 566 are positioned proximate to the area 559 from which infrared light 558 is directed to the eye 552. The multiple photodetectors 566 may be physically clustered together or spatially separated on the frame 568 so long as the photodetectors 566 are proximate to the area 559.

The WHUD 554 further includes at least one processor 570 communicatively coupled the micro display 556 and the photodetectors 566. The WHUD 554 includes at least one storage medium or memory 572 communicatively coupled to the processor 570. The memory 572 stores processor-executable instructions and/or data that, when executed by processor 570, cause WHUD 554 to implement eye tracking (at least) as described herein.

Figure 6:
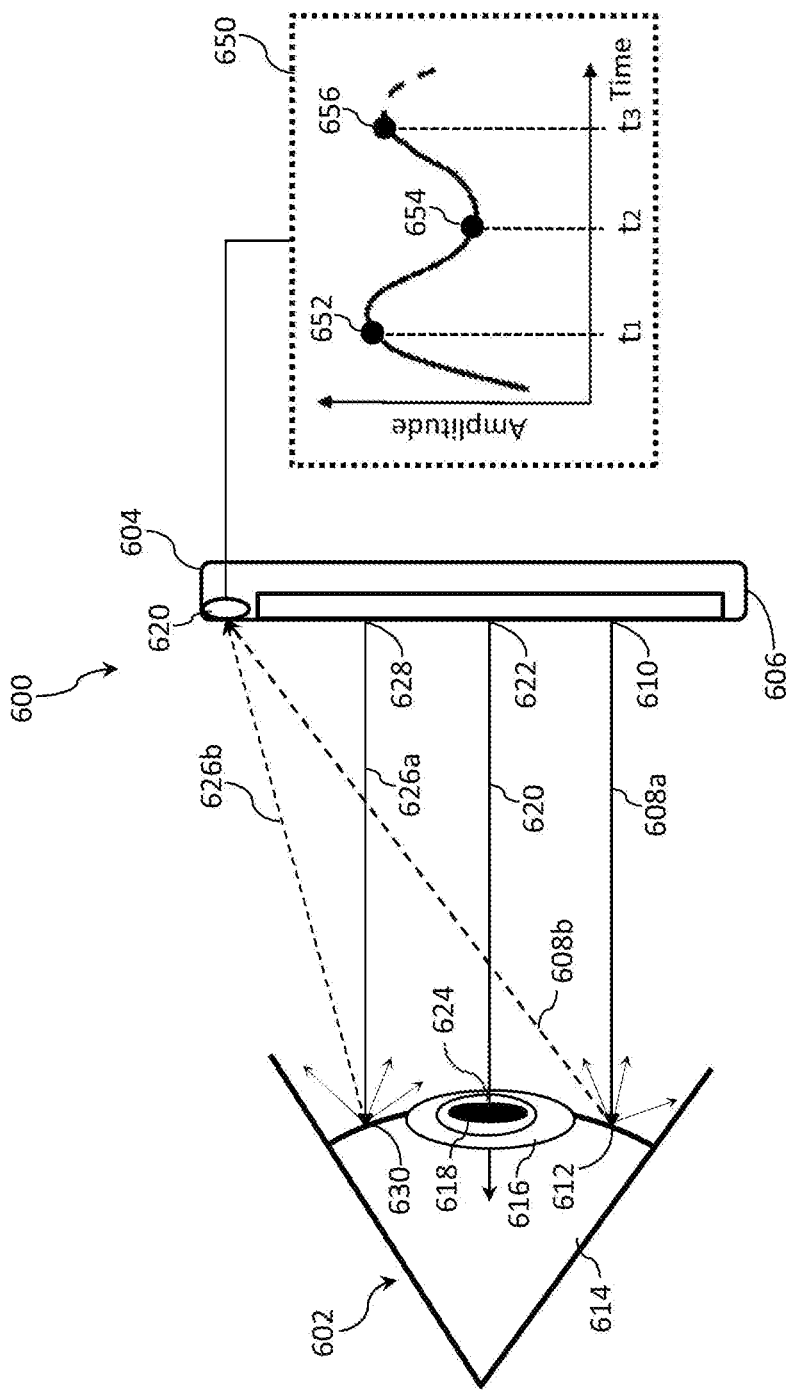
FIG. 6 is a diagram of an eye tracking, shown in relation to a user's eye, during an exemplary eye tracking operation, in accordance with an embodiment.

Referring to FIG. 6, illustrated therein is an eye tracking system 600, performing an exemplary eye tracking operation, in accordance with an embodiment. The eye tracking system 600 may be substantially similar to the eye tracking system 500, 550 of FIGS. 5A and 5B. The eye tracking system 600 includes a device 604 and an eye 602 of a user. The device 604 includes a microLED display 606 (such as microLED display 406 of FIG. 4 or microLED display 506 of FIG. 5A). The microLED display 606 includes a plurality of pixels (such as pixel 408 in FIG. 4 or pixel 210 in FIG. 2A). The eye 602 includes a sclera 614, a cornea 616 and a pupil 618.

During the first stage of the eye tracking, infrared light 608a emitted by a pixel (i.e. pixel 408 in FIG. 4) at a first position 610 in the microLED display 606 impinges on a first point 612 on the eye 602. The first point 612 on eye 602 is on the sclera 614 of eye 602 and not on the cornea 616. The infrared light 608a that is incident on eye 602 is diffusely reflected (i.e., scattered) from point 612 over a range of directions (indicated by solid arrows emanating from point 612). A component (or a range of components) 608b of this diffusely reflected infrared light impinges on and is detected by an infrared photodetector 620.

For the purpose of illustration, FIG. 6 includes graph 650 that represents the amplitude of the output of photodetector 620 at various times during the exemplary operation corresponding to illumination of various points on eye 602 based on infrared light emitted from various positions on microLED display 606.

FIG. 6 shows the exemplary eye tracking operation at a first stage corresponding to time $t_1$ in graph 650. The diffuse reflection from point 612 on the sclera 614 of eye 602 roughly corresponds to a first peak at 652 in the amplitude of the signal from photodetector 620 as depicted in graph 650. Relatively high amplitude signals from photodetector 620 (such as signal 652 in graph 650) generally correspond to relatively high intensity infrared reflections from eye 602. In accordance with the present systems, devices, and methods, relatively high intensity infrared reflections from eye 602 correspond to points (such as point 612) on the sclera 614 of eye 602.

During the second stage of the exemplary eye tracking operation depicted in FIG. 6, infrared light 620 emitted by a pixel (i.e. pixel 408 in FIG. 4) at a second position 622 in the microLED display 606 impinges on a second point 624 on the eye 602. The second point 624 on eye 602 is on the cornea 616 of eye 602 and not on the sclera 614. An appreciable portion of the infrared light 620 that is incident on the cornea 616 at 624 is transmitted through the pupil 618 of eye 602 and not reflected. Some of infrared light 620 may be diffusely reflected (not illustrated) but less of infrared light 620 is diffusely reflected from the second point 624 on the cornea 616 of eye 602 compared to the proportion of infrared light 608a that was diffusely reflected from point 612 on the sclera 614 of eye 602.

Accordingly, graph 650 shows that at the second stage of the exemplary eye tracking operation (corresponding to time $t_2$), the amplitude of the signal from photodetector 620 corresponds to a point 654 in or near a trough or minimum of the amplitude signal profile. Relatively low amplitude signals from photodetector 620 (such as signal 654 in graph 650) generally correspond to relatively low intensity infrared reflections from eye 602. Relatively low intensity infrared reflections from eye 602 correspond to points (such as point 624) on the cornea 616 of eye 602.

During the third stage of the exemplary eye tracking operation depicted in FIG. 6, infrared light 626a emitted by a pixel (i.e. pixel 408 in FIG. 4) at a third position 628 in the microLED display 606 impinges on a third point 630 on the eye 602. Third point 630 on the eye 602 is on the sclera 614 of eye 602 and not on the cornea 616. The infrared light 626a that is incident on eye 602 is diffusely reflected (e.g., scattered) from point 630 over a range of directions (indicated by solid arrows emanating from point 630). A component 626b (or a range of components) of this diffusely reflected infrared light impinges on and is detected by the infrared photodetector 620. Graph 650 shows that at the third stage of the exemplary eye tracking operation (corresponding to time $t_3$), the amplitude of the signal from photodetector 620 corresponds to a point 656 at or near a peak or maximum of the amplitude signal profile, similar to point 652 at time $t_1$.

Relatively low amplitude signals from photodetector 620 (such as signal 654 in graph 650) generally correspond to relatively low intensity infrared reflections from eye 602. Relatively low intensity infrared reflections from eye 602 correspond to points (such as point 624) on the cornea 616 of eye 602. Thus, the diffuse reflection from point 630 on the sclera 614 of eye 692 roughly corresponds to a second peak at 656 in the amplitude of the signal from photodetector 620 as depicted in graph 650.

At least two factors may contribute to the relatively lower intensity infrared reflections from points (i.e., point 624) on the cornea 616 of the eye 602 compared to points (i.e., points 612 and 630) on the sclera 614 of the eye 602: i) a portion of infrared light 620 incident on the cornea 616 of the eye 602 may actually be transmitted into the eye 602 via the pupil 618 and not diffusely reflected towards photodetector 620; and/or ii) the portion of infrared light 620 incident on the cornea 616 of the eye 602 that is diffusely reflected may be diffusely reflected over a wider range of directions because the cornea 616 of the eye 602 has a smaller radius of curvature than the sclera 614 of the eye 602. Either of these factors, or both factors in combination, may result in lower intensity infrared reflections at photodetector 620 when the incident infrared light impinges on the cornea 616 of eye 602 compared to when the incident infrared light 608a or 626a impinges on the sclera 614 of the eye 602.

Still referring to FIG. 6, infrared light (i.e., 608a, 620 and 626a) that is incident over the width of the eye 602 may produce minimal diffuse infrared reflections while the infrared light (i.e., 620) is incident over the cornea 616 and maximal diffuse infrared reflections while the infrared light (i.e., 608a and 626a) is incident over the two respective regions of sclera 614 on either side of the cornea 616. For a static photodetector 620, this may produce an "M" shaped signal profile having two peaks (near points 652 and 656) on either side of one trough (near point 654) as depicted in graph 650. In the present systems, devices, and methods, such a trough is termed a "corneal shadow."

Based on the corneal shadow effect, the relative position of the cornea of the eye (and a user's gaze direction) may be identified by mapping the trough/minimum (i.e., point 654) of the signal from the photodetector (i.e., graph 650) to the corresponding point (i.e., 630, 618 or 612) at which the infrared light was incident on the eye 602. Preferably, the relative position of the eye (and gaze direction) is identified by mapping a peak or maximum (i.e. point 652 and/or point 656) of the signal from the photodetector (i.e. graph 650) to the corresponding point (i.e. 630, 618 or 612) at which the infrared light was incident on the eye 602. This mapping may be done, for example, based on one or more illumination parameter(s) of the infrared light (i.e., 608a, 620 or 626a), including without limitation: the position (i.e., 610, 622 or 628) of at least one pixel (such as pixel 508 in FIG. 5A) in the microLED display 606 from which infrared light is projected onto the eye 602, the respective positions of at least two pixels in the microLED display, and/or a modulation pattern of the infrared light.

As previously described, the systems, devices, and methods for eye tracking described herein are particularly well-suited for use in mobile device displays (though in no way limited to such applications). In addition to being able to integrate with a mobile device-based display system, the eye tracking techniques described herein also use considerably less power than conventional camera-based eye tracking techniques and so a mobile device display that implements infrared eye tracking as described herein can manage with a considerably smaller battery than what is needed to power conventional camera-based eye tracking. These power savings can arise from any or all of three aspects: i) conventional camera-based eye trackers illuminate the entire area of the eye at all times using an infrared LED, whereas the eye tracking described herein uses an infrared light emitted by microLED(s) to illuminate only a single small region of the eye at a time; ii) conventional camera-based eye trackers record, store, and process fairly high resolution video of the eye at all times whereas infrared eye tracking uses only one or more low power infrared photodetector(s) to detect diffuse reflections of infrared light; and iii) conventional camera-based eye trackers require computationally intensive video processing to identify "glints" whereas the present eye tracking simply identifies relatively low intensity infrared reflections and associates those with regions of the eye (e.g., based on one or more illumination parameter(s) of the projected infrared light).

FIG. 7 is a flow chart showing a method 700 for determining the gaze of a user in accordance with an embodiment. In alternative embodiments certain acts may be omitted and/or additional acts may be added. Those of skill in the art will also appreciate that the illustrated order is shown for exemplary purposes and may change in alternative embodiments. The method 700 may be performed by components and devices, such as device 504 of FIG. 5A. The elements from FIG. 5A are identified in parenthesis for reference.

At 702, infrared light (514) is projected over at least a portion of an eye (502) of a user. The infrared light may be projected by a pixel (510) that has an infrared emitter (512).

At 704, at least one infrared photodetector (520) detects reflections of the infrared light (518) from the eye (502) of the user. The reflections of light (518) detected by the at least one infrared photodetector (520) may include diffuse reflections (as opposed to specular reflections, though specular reflections may also be detected if the alignment of the infrared emitter (512), eye (502) and photodetector (520) enables such).

At 706, a processor (524) determines a relative intensity of each reflection detected at 704. Generally, as infrared light (512) is projected over the eye (502), each respective point (516) on the eye (502) may produce a respective diffuse reflection (518), at least a portion of which is detected by at least one infrared photodetector (520). The relative intensity of each respective diffuse reflection is determined by the processor (524) at 706.

At 708, the processor (524) determines a position of the eye (502) based on the relative intensities measured at 706. 708 may be accomplished by identifying at least one region of the eye (502) that corresponds to a relatively low-intensity reflection. For example, the processor (524) may identify a dip, trough, or minimum in the amplitude of the signal (i.e., point 654 in graph 650 of FIG. 6) provided by the at least on infrared photodetector (520). In some implementations, the processor (524) may map, assign or otherwise associate each reflection to/with a respective region of the eye (502) and then, once a relatively-low intensity reflection has been identified, the processor may identify the region of the eye (502) to which the relatively low-intensity reflection corresponds. In order to map, assign, or otherwise associate each reflection to/with a respective region of the eye (502), the processor may map, assign, or otherwise associate each reflection to/with a corresponding illumination parameter of the device (504).

As previously described, exemplary illumination parameters include, without limitation: the position of at least one pixel (508) in the microLED display (506) from which infrared light is projected onto the eye 602, the respective positions of at least two pixels in the microLED display (506) from which infrared light is projected onto the eye (502), and/or a modulation pattern of the infrared light. As an example, the microLED display (506) may include a first pixel (508) at a first position (i.e. position 610 in FIG. 6) that projects infrared light over the eye (502) at a first modulation pattern, and a second pixel (508) at a second position (i.e., position 620 in FIG. 6) that that projects infrared light over the eye (502) at a second modulation pattern. In this configuration, the total area of the microLED display may be represented by a xy-grid for which the respective positions each pixel (508) correspond to a respective x-coordinate and a respective y-coordinate. Each xy-coordinate then corresponds to a unique region of the microLED display (506) and at 708 the processor (524) may identify one or more xy-coordinate(s) that correspond(s) to a relatively low-intensity reflection. A coordinate system based on xy-coordinates is used here as an example only, whereas alternative implementations may use other coordinate systems (such as radial or polar coordinate systems) or no coordinate system at all (such as an area-based or graph coloring scheme). The processor (524) determines a position the eye (502) based on the at least one region of the eye (502) that the processor identified as corresponding to the relatively low-intensity reflection. The processor (524) may determine the position of the eye (502) by, for example, identifying a position of the cornea (522) based on a mapping, assignment, or association between reflections and regions of the eye. For example, the processor (524) may identify the cornea position in the region of the eye (502) that maps to, assigns to, associates with, or generally corresponds to a dip, trough, or minimum (i.e., point 654 in graph 650 of FIG. 6) in the amplitude of the signal provided by one or more photodetector(s) (520). In the xy-grid example above, the processor may identify the cornea position as directly corresponding to the xy-coordinate that provides the lowest intensity reflection. More sophisticated algorithms may identify the cornea position as a particular xy-coordinate (such as a centroid) within or proximate a cluster of xy-coordinates that all have relatively low reflection intensity.

In alternative embodiments, at 708, the position of the eye (502) may be determined by identifying at least one region of the eye (502) that corresponds to a relatively high-intensity reflection. For example, the processor (524) may determine the position of the eye (502) by, identifying a position of the sclera (528) based on a mapping, assignment, or association between reflections and regions of the eye. For example, the processor (524) may identify the sclera position in the region of the eye (502) that maps to, assigns to, associates with, or generally corresponds to a peak, or maximum (i.e., points 652 and 656 in graph 650 of FIG. 6) in the amplitude of the signal provided by one or more photodetector(s) (520). In the xy-grid example above, the processor may identify the sclera position as directly corresponding to the xy-coordinate that provides the highest intensity reflection.

At 710, the processor (524) determines a gaze direction of the user based on the position of the eye (502). For example, each eye position may be mapped, assigned, or associated to/with a respective unique gaze direction and the processor (524) may identify (e.g., via a look-up table or similar) the corresponding gaze direction at 710 once the eye position is identified at 708. Gaze direction may be characterized as, for example, a vector projection extending out from the xy-coordinate that corresponds to the eye position (or the centroid thereof). The human eye is relatively constant in size among individual adults with a vertical diameter of about 24 millimeters; likewise, the cornea has a reasonably constant diameter of about 11.5 millimeters. Thus, a vector projection may be defined normal to the surface of the eye and its direction may be based on this 24 millimeter average vertical diameter of the eye (502) and/or 11.5 millimeter diameter of the cornea (522).

As previously described, the microLED display (506), the photodetector(s) (520), and the processor (524) may all be respective components of a device (504) that further includes a memory (526). The memory (524) may store processor-executable instructions and/or data that, when executed by the processor (524), cause the processor to perform, execute, or complete acts 706, 708 and 710 of method 700. The processor (526) may also be communicatively coupled to and control the operation of the microLED display (506) and/or the photodetector(s) (520) and the non-transitory processor-readable storage medium (526) may further store processor-executable instructions and/or data that, when executed by the processor (524), cause microLED display (506) to perform, execute, or complete act 702 of method 700 and/or cause the photodetector(s) (520) to perform, execute, or complete act 704 of method 700.

For applications that may involve use outdoors, it can be advantageous to use infrared light (514) that is substantially distinct from solar infrared light. For example, infrared light (514) having a greater wavelength (e.g., around 950 nm as opposed to around 850 nm) can help to distinguish infrared light (518) detected by an infrared photodetector (520) from solar infrared light detected by an infrared photodetector (520).

Throughout this specification and the appended claims, references are made to mappings, associations, assignments, and the like. Unless the specific context requires otherwise, the act of performing a mapping, association, assignment, or similar should respectively be construed as "effecting a mapping," "effecting an association," "effecting an assignment," and so on. To "effect a mapping" (or similar) means to perform an algorithm and/or a series of data processing acts, by a processor (524), that results in a mapping from one parameter (e.g., an illumination parameter) to another parameter (e.g., a region of the eye). The algorithm and/or series of data processing acts or steps may, for example, employ a pre-defined mapping such as a stored look-up table, or may, for example, employ an application of rules or actions that produce a mapping, such as a series of "if then" or "if then else" statements.

The various mappings, assignments, and/or associations between reflections and regions of the eye and/or cornea positions and/or gaze directions described herein may be based on a result of one or more calibration process(es) of the eye tracking system (500). For example, a user may be instructed to direct their gaze in a specific direction (or in a series of specific directions) while their eye is tracked in order to calibrate such mappings, assignments, and/or associations.

Certain features and/or activities, including without limitation, blinks, eyelashes, eye saccades, changes in pupil diameter due to changes in brightness, and so on, may be identified and/or compensated in post-processing the signals provided by the photodetector(s) (520) herein. In some implementations, the processor (524) may identify an effect associated with such features and/or activities and either discard, disqualify, skip, omit, or generally not use the corresponding signal. In other implementations, the processor (524) may identify an effect associated with such features and/or activities and then trigger another action, such as interface control based on blink/wink detection and/or heartbeat determination based on saccadic timing.

In order to account for detection of ambient light by the photodetector (520), either directly or as reflected from the eye (502), the photodetector (520) may regularly be sampled even when the microLED display (506) is inactive in order to provide a baseline signal intensity above which infrared light reflections may be characterized.

In some implementations, multiple photodetectors (520) may be used to detect reflections of narrow waveband (e.g., infrared) light from the eye of the user, and the multiple photodetectors (520) may be physically clustered together or spatially separated around the support frame of a microLED display (506) or device (504) incorporating the same.

Where infrared light is used to illuminate all or a portion of the eye for eye tracking purposes, the full area of the eye may be completely illuminated or portions of the eye may be illuminated in any of various patterns. Examples of illumination patterns include: "binary style search" in which the area of the eye is divided into binary regions, the eye tracker determines which of the two regions contains a feature (e.g., the sclera or cornea), that region is subsequently divided into binary regions, and the process is continued with smaller and smaller regions until the position of the feature is identified with the desired resolution; "recent area focus" in which once a trusted eye position is found subsequent scans are limited to a subset of the full display that includes the position of the known eye position, with the subset being based on the likelihood of where the eye could possibly move within the time since the trusted eye position was identified; and/or "rotary scan" in which the area of the eye is divided into wedges or pie pieces which are scanned in succession.

The use of infrared light is advantageous because such light is readily distinguishable from the visible light provided by the microLED display (506). However, infrared light is also prevalent in the environment so a narrow waveband photodetector (520) that is optimized to be responsive to infrared light will nevertheless detect environmental noise. In order to help mitigate this effect, infrared light that is used for eye tracking purposes may be encoded in any of a variety of different ways to enable such light to be distinguished from environmental light of a similar wavelength. For example, narrow waveband infrared light that is used for eye tracking purposes may be deliberately polarized and a corresponding polarization filter may be applied to a narrow waveband infrared photodetector so that the photodetector is only responsive to light that is in the narrow waveband and of the correct polarization. As another example, narrow waveband light that is used for eye tracking purposes may be modulated with a deliberate modulation pattern (e.g., intensity, time, intensity and time) and light providing this pattern can be extracted from the intensity map provided by the photodetector during the signal processing and analysis of the photodetector output.

The various embodiments described herein generally reference and illustrate a single eye of a user (i.e., monocular applications), the present systems, devices, and methods may be duplicated in order to provide infrared light eye tracking of both eyes of the user (i.e., binocular applications).

One consequence of integrating eye tracking into a microLED display is that the resulting eye tracking capability is only active when the microLED display itself is active. In some situations, it may be desirable to provide a coarse eye tracking functionality even when the microLED display is turned off. To this end, the various embodiments described herein may optionally include a separate eye tracking system to enable the user to activate the microLED display by glancing at one or more specific location(s).

The various embodiments described herein may be applied in other applications not described herein. For example, the present systems, devices, and methods may be applied in wearable heads-up displays and/or in other applications that may or may not include a visible display.

The devices described herein may include one or more sensor(s) (e.g., microphone, camera, thermometer, compass, altimeter, and/or others) for collecting data from the user's environment. For example, one or more camera(s) may be used to provide feedback to the processor of the device and influence where on the display(s) any given image should be displayed.

The devices described herein may include one or more on-board power sources (e.g., one or more battery(ies)), a wireless transceiver for sending/receiving wireless communications, and/or a tethered connector port for coupling to a computer and/or charging the one or more on-board power source(s).

The devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims, the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "memory" can be any element that can store the program associated with logic and/or information for use by or in connection with the instruction execution system, apparatus, and/or device. The memory can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein US Patent Publication No. US 2015-0378161 A1, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/156,736, U.S. Provisional Patent Application Ser. No. 62/214,600, U.S. Provisional Patent Application Ser. No. 62/167,767, U.S. Provisional Patent Application Ser. No. 62/271,135, U.S. Provisional Patent Application Ser. No. 62/245,792, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, are all incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display system that tracks eye movement, the display system comprising:
a plurality of pixels to emit light, wherein at least a first pixel includes a first infrared emitter to project infrared light over an eye of user at a first modulation pattern and at least one of a red emitter, a blue emitter, and a green emitter, and wherein at least a second pixel includes a second infrared emitter to project infrared light over the eye at a second modulation pattern;
at least one infrared photodetector oriented to detect infrared light reflected from the eye; and
a processor communicatively coupled to at least the first pixel and the at least one infrared photodetector, the processor to:

determine relative intensities of a plurality of reflections of infrared light detected by the infrared photodetector;

identify a region of the eye as the sclera based on the relative intensities of the plurality of reflections; and determine a position of the eye based on the region of the eye.

2. The display system of claim 1, wherein the processor is to identify a position of the sclera based on a region of the plurality of pixels that provides the highest intensity reflection detected by the at least one infrared photodetector.

3. The display system of claim 1, further comprising a backplane coupled to the plurality of pixels, the backplane to modulate a drive current to each emitter.

4. The display system of claim 1, further comprising a focusing lens positioned and oriented to focus light emitted by the plurality of pixels.

5. The display system of claim 4, further comprising a blur filter positioned and oriented to color combine light emitted by the plurality of pixels at a focal point.

6. The display system of claim 4, further comprising a scattering screen positioned and oriented to color combine light emitted by the plurality of pixels at a focal point.

7. The display system of claim 6, further comprising optics to direct light from the scattering screen to a destination of an image.

8. The display system of claim 1, wherein the plurality of pixels is arranged in a two-dimensional array, wherein each pixel in the two-dimensional array includes a red emitter, a blue emitter, a green emitter and an infrared emitter.

9. The display system of claim 1, wherein the plurality of pixels is arranged in a two-dimensional array, wherein adjacent pixels in each row and column of the two-dimensional array alternate between:

a first pixel, wherein the first pixel includes a red emitter, a blue emitter, a green emitter and an infrared emitter; and a second pixel, wherein the second pixel includes a red emitter, a blue emitter and two green emitters.

10. The display system of claim 1, wherein the plurality of pixels is arranged in a two-dimensional array, wherein each pixel positioned at a corner of the two-dimensional array includes a red emitter, a blue emitter, a green emitter and an infrared emitter, and wherein each pixel not positioned at a corner of the two-dimensional array includes a red emitter, a blue emitter, and two green emitters.

11. A micro display comprising:

a set of micro light-emitting diode (uLED) pixels arranged in a two-dimensional array, the set of uLED pixels including at least a first subset of pixels, each pixel in the first subset of pixels comprising:

a red uLED to emit red light;

a green uLED to emit green;

a blue uLED to emit blue light; and an infrared uLED to emit infrared light onto an eye of a user;

wherein the infrared uLED of a first pixel is to project infrared light over the eye at a first modulation pattern and the infrared uLED of a second pixel is to project infrared light over the eye at a second modulation pattern;

at least one infrared photodetector oriented to detect a plurality of reflections of infrared light reflected from the eye; and a processor communicatively coupled to at least the first subset of pixels and the at least one infrared photodetector, the processor to:

determine relative intensities of the plurality of reflections of the infrared light detected by the infrared photodetector;

identify a region of the eye as the sclera based on the relative intensities of the plurality of reflections; and determine a position of the eye based on the region of the eye.

12. The micro display of claim 11, further comprising a backplane coupled to the set of uLED pixels, the backplane to modulate a drive current to each uLED.

13. The micro display of claim 11, wherein for each pixel in the first subset of pixels, the red uLED, the green uLED, the blue uLED, and the infrared uLED are arranged in a 2 by 2 Bayer-like configuration.

14. The micro display of claim 13, wherein the 2 by 2 Bayer-like configuration includes a first uLED position, a second uLED position, a third uLED position and a fourth uLED position, wherein the red uLED, the green uLED, the blue uLED, and the infrared uLED each occupy one of the first uLED position, the second uLED position, the third uLED position and the fourth uLED position.

15. The micro display of claim 11 wherein the set of uLED pixels includes a second subset of pixels, each pixel in the second subset of pixels comprising:

at least one red uLED to emit red light;

at least one blue uLED to emit blue light; and at least one green uLED to emit green.

16. The micro display of claim 11, wherein the processor is to identify a position of the sclera based on a region of the two-dimensional array that provides the highest intensity reflection detected by the at least one infrared photodetector.

17. A method of tracking eye movement of a user viewing a display screen, the method comprising:

projecting infrared light from a first pixel of a plurality of pixels in the display screen to an eye of the user at a first modulation pattern;

projecting infrared light from a second pixel of the plurality of pixels in the display screen to the eye of the user at a second modulation pattern;

detecting a plurality of reflections of the infrared light from the eye;

determining relative intensities of the plurality of reflections;

identifying a region of the eye as the sclera based on the relative intensities of the plurality of reflections; and determining a position of the eye based on the region of the eye.

18. The method of claim 17 wherein projecting infrared light from at least one pixel in the display screen includes projecting infrared light from at least one infrared uLED in the display screen.

19. The method of claim 17 further comprising:

identifying a position of the sclera based on a region of the display screen that provides the highest intensity reflection detected by at least one infrared photodetector of at least one pixel in the display screen.

20. The method of claim 19 wherein projecting infrared light from the plurality of pixels in the display screen includes projecting infrared light from each pixel successively.

* * * * *